(12) United States Patent
Li

(10) Patent No.: US 6,519,166 B1
(45) Date of Patent: Feb. 11, 2003

(54) APPARATUS AND METHOD FOR CONTROLLED PRELOAD OPERATION OF AN ELECTRICAL CONVERTER

(76) Inventor: Li Li, 430 Buckingham Rd., Apt. 932, Richardson, TX (US) 75081

(*) Notice: Subject to any disclaimer, the term of this patent is extended or adjusted under 35 U.S.C. 154(b) by 0 days.

(21) Appl. No.: 10/046,007

(22) Filed: Oct. 27, 2001

(51) Int. Cl.[7] .............................................. H02M 3/335
(52) U.S. Cl. ................................................... 363/21.17
(58) Field of Search ........................... 363/21.11, 21.12, 363/21.16, 16, 17, 20, 95, 97, 131

(56) References Cited

U.S. PATENT DOCUMENTS

| | | | | |
|---|---|---|---|---|
| 5,122,945 A | * | 6/1992 | Marawi | 363/56 |
| 5,528,480 A | * | 6/1996 | Kikinis et al. | 363/15 |
| 5,726,869 A | * | 3/1998 | Yamashita et al. | 363/97 |
| 6,169,675 B1 | * | 1/2001 | Shimamori et al. | 363/70 |
| 6,333,862 B1 | * | 12/2001 | Lee et al. | 363/21.16 |

* cited by examiner

Primary Examiner—Rajnikant B. Patel
(74) Attorney, Agent, or Firm—Law Office of Donald D. Mondul

(57) ABSTRACT

An apparatus for effecting a preload operation of an electrical converter device that includes a primary circuit section inductively coupled with at least one secondary circuit section presenting at least one output voltage at at least one output locus includes: (a) a load coupled with at least one selected output locus of the at least one output locus; (b) a switch device electrically coupling the load within the at least one secondary circuit section; and (c) a timer device coupled with the switch device. The timer device orients the switch device to electrically disconnect the load from the at least one secondary circuit section after a predetermined time interval elapses.

21 Claims, 5 Drawing Sheets

APPARATUS AND METHOD FOR CONTROLLED PRELOAD OPERATION OF AN ELECTRICAL CONVERTER

BACKGROUND OF THE INVENTION

The present invention is directed to electrical converters, and especially to electrical converters that are small in size to facilitate their employment in products as a board mounted converter, or board mounted power supply device.

Many products today require multi-output power converters for their operation. In particular, dual output switched power converters are required that exhibit monotonic operation (i.e., the output voltage changes only in one direction) using a no-load start-up mode of operation and require regulated output or prebias characteristics under no-load conditions.

No-load start-up exhibiting monotonic operation has been achieved in the past by altering the feedback circuitry that monitors the output voltage and operates pulse width modulating circuitry to produce the desired output voltage. Such feedback circuitry modifications have been complex, bulky and expensive. The present invention is simple, compact, has a low part count (therefore having a lesser tendency to break down) and inherently insures that the converter device never starts with a no-load configuration.

Regulated output of a multi-output converter, such as a dual output converter, has been solved in the past by inserting a no-load resistance in the output circuitry of the converter. A problem with such an approach is that the no-load resistance is ever after in the output circuit of the converter during normal operation of the converter and therefore contributes to undesirable power consumption by the converter. This excess power consumption is usually manifested as unwanted heat. Prior art designers have included timer devices in the converter output circuitry to disconnect the no-load resistance from the converter output circuitry after a predetermined time. However, the timer circuitry employed in such prior art solutions has been bulky and complex. The complexity added cost and created an increased potential for break down to the products using those converter devices. Their bulkiness and complexity increased the difficulty of manufacturing a product employing such converters in compact, board mounted power supply devices.

The present invention provides a timed resistance in output circuitry of a converter for inclusion during no-load operation of the converter. The present invention is embodied in an apparatus having a low part count that uses power from an already existing power source within the converter devices with which it is intended to be used.

SUMMARY OF THE INVENTION

An apparatus for effecting a preload operation of an electrical converter device that includes a primary circuit section inductively coupled with at least one secondary circuit section presenting at least one output voltage at at least one output locus includes: (a) a load coupled with at least one selected output locus of the at least one output locus; (b) a switch device electrically coupling the load within the at least one secondary circuit section; and (c) a timer device coupled with the switch device. The timer device orients the switch device to electrically disconnect the load from the at least one secondary circuit section after a predetermined time interval elapses.

A method for effecting a controlled preload operation of an electrical converter device including a primary circuit section inductively coupled with a plurality of secondary circuit sections, each presenting an output voltage at a respective output locus, includes the steps of: (a) providing a respective load coupled with each respective output locus; (b) providing a respective switch device electrically coupling each respective load within a respective secondary circuit section; (c) providing a respective timer device coupled with each respective switch device; and (d) operating each respective timer device to orient the respective switch device to electrically disconnect the respective load from the respective secondary circuit section after a predetermined time interval elapses.

It is, therefore, an object of the present invention to provide an apparatus and method for effecting a preload operation of an electrical converter device that is compact in construction and efficient in operation.

Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

Figure 1:
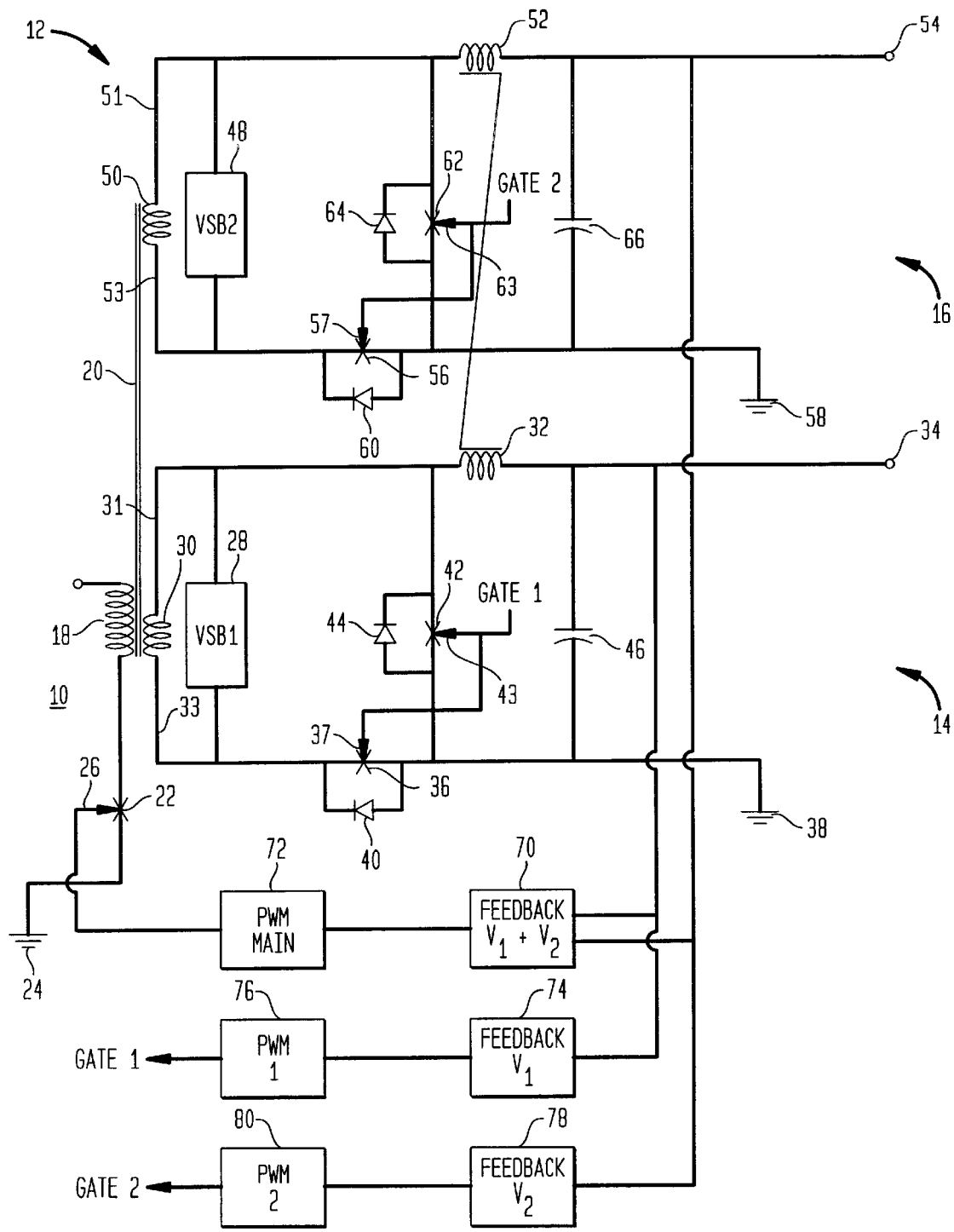
FIG. 1 is an electrical schematic diagram of a prior art dual-output electrical converter apparatus.

FIG. 1 is an electrical schematic diagram of a prior art dual-output electrical converter apparatus. In FIG. 1, a converter apparatus 10 is configured for dual output and includes a primary section 12 and secondary sections 14, 16. Primary section 12 includes the primary winding 18 of a transformer 20 and a switch 22 for selectively coupling primary winding 18 to ground 24. Switch 22 is gatingly controlled by a gating signal applied at a gate 26.

Secondary section 14 includes a secondary winding 30 of transformer 20. Secondary winding 30 has two connection loci 31, 33. Connection locus 31 is coupled with an inductor 32. Inductor 32 is coupled with a first output locus 34. Connection locus 33 is coupled with a switch 36, and switch 36 is coupled with a ground locus 38. A diode element 40 is connected in parallel with switch 36. Typically, diode element 40 is integrally included with switch 36 when switch 36 is embodied in a MOSFET structure. A switch 42 is connected in parallel with secondary winding 30 between inductor 32 and ground locus 38, and a diode element 44 is connected in parallel with switch 42. Typically, diode element 44 is integrally included with switch 42 when switch 42 is embodied in a MOSFET structure. A capacitor 46 is coupled in parallel with secondary winding 30 between inductor 32 and output locus 34. Switch 36 is gatingly controlled by a gating signal applied at a gate 37. Switch 42 is gatingly controlled by a gating signal applied at a gate 43.

Secondary section 14 also includes a secondary bias power circuit 28 coupled in parallel across secondary winding 30. Secondary bias power circuit 28 is provided to power selected elements in secondary section 14, such as pulse width modulation circuitry (to be described later) and other circuit elements. Details of connections for providing power by secondary bias power circuit 28 are not illustrated in detail in FIG. 1 in order to avoid cluttering FIG. 1.

Secondary section 16 includes a secondary winding 50 of transformer 20. Secondary winding 50 has two connection loci 51, 53. Connection locus 51 is coupled with an inductor 52. Inductor 52 is connected with a first output locus 54. Preferably inductors 32, 52 are coupled. Connection locus 53 is coupled with a switch 56, and switch 56 is coupled with a ground locus 58. A diode element 60 is connected in parallel with switch 56. Typically, diode element 60 is integrally included with switch 56 when switch 56 is embodied in a MOSFET structure. A switch 62 is connected in parallel with secondary winding 50 between inductor 52 and ground locus 58, and a diode element 64 is connected in parallel with switch 62. Typically, diode element 64 is integrally included with switch 62 when switch 62 is embodied in a MOSFET structure. A capacitor 66 is coupled in parallel with secondary winding 50 between inductor 52 and output locus 54. Switch 56 is gatingly controlled by a gating signal applied at a gate 57. Switch 62 is gatingly controlled by a gating signal applied at a gate 63.

Secondary section 16 also includes a secondary bias power circuit 48 coupled in parallel across secondary winding 50. Secondary bias power circuit 48 is provided to power selected elements in secondary section 16, such as pulse width modulation circuitry (to be described later) and other circuit elements. Details of connections for providing power by secondary bias power circuit 48 are not illustrated in detail in FIG. 1 in order to avoid cluttering FIG. 1.

A primary feedback circuit 70 is coupled with output loci 34, 54 to monitor the value of the voltage sum $(V_1+V_2)$ of output voltages $V_1$, $V_2$ from secondary sections 14, 16. Primary feedback circuit 70 provides an output signal indicating the voltage sum $(V_1+V_2)$ from secondary sections 14, 16 to a primary pulse width modulation unit 72. Primary pulse width modulation unit 72 provides a gating signal to gate 26 of switch 22. Switch 22 controls operational inclusion of primary winding 18 in converter apparatus 10 in response to a gating signal applied at gate 26 from primary pulse width modulation unit 72 based upon the value of the voltage sum $(V_1+V_2)$ from secondary sections 14, 16.

A secondary feedback circuit 74 is coupled with output locus 34 to monitor the value of output voltage $V_1$ from secondary section 14. Secondary feedback circuit 74 provides an output signal indicating output voltage $V_1$ from secondary section 14 to a secondary pulse width modulation unit 76. Secondary pulse width modulation unit 76 provides a gating signal to gates 37, 43 of switches 36, 42. Switches 36, 42 control operational inclusion of secondary section 14 in converter apparatus 10 in response to a gating signal applied to gates 37, 43 from secondary pulse width modulation unit 76 based upon the value of output voltage $V_1$ from secondary section 14. Operation of switches 36, 42 is related to operation of switch 22 (in primary section 12). Switch 36 operates in-phase with switch 22; switch 42 operates out-of-phase with switch 22. Secondary pulse width modulation unit 76 affects operation of switches 36, 42 using gating signal GATE 1 when output from secondary feedback circuit 74 indicates a need to adjust output voltage $V_1$. For example if $V_1$ is increasing, when $V_1$ reaches a predetermined value secondary pulse width modulating unit 76 will operate to reduce driving voltages for switches 36, 42. Such a reduction in drive voltage causes an increased voltage drop across switches 36, 42 so that $V_1$ decreases. Because $(V_1+V_2)$ remains constant, a reduction in $V_1$ causes an increase in $V_2$, and an increase in $V_1$ causes a decrease in $V_2$. It is by such an arrangement that local control of one secondary feedback circuit 74, 78 can impose some regulation for both secondary sections 14, 16.

A secondary feedback circuit 78 is coupled with output locus 54 to monitor the value of output voltage $V_2$ from secondary section 16. Secondary feedback circuit 78 provides an output signal indicating output voltage $V_2$ from secondary section 16 to a secondary pulse width modulation unit 80. Secondary pulse width modulation unit 80 provides a gating signal to gates 57, 63 of switches 56, 62. Switches 56, 62 control operational inclusion of secondary section 16 in converter apparatus 10 in response to a gating signal applied to gates 57, 63 from secondary pulse width modulation unit 80 based upon the value of output voltage $V_2$ from secondary section 16. Operation of switches 56, 62 is related to operation of switch 22 (in primary section 12). Switch 56 operates in-phase with switch 22; switch 62 operates out-of-phase with switch 22. Secondary pulse width modulation unit 80 affects operation of switches 56, 62 using gating signal GATE 2 when output from secondary feedback circuit 78 indicates a need to adjust output voltage $V_2$. For example if $V_2$ is increasing, when $V_2$ reaches a predetermined value secondary pulse width modulating unit 80 will operate to reduce driving voltages for switches 56, 62. Such a reduction in drive voltage causes an increased voltage drop across switches 56, 62 so that $V_2$ decreases. Because $(V_1+V_2)$ remains constant, a reduction in $V_2$ causes an increase in $V_1$, and an increase in $V_2$ causes a decrease in $V_1$. It is by such an arrangement that local control of one secondary feedback circuit 74, 78 can impose some regulation for both secondary sections 14, 16.

Diodes 40, 44, 60, 64 serve to ensure that current flows in only one direction during critical times of operation of converter apparatus 10, such as during start-up operations. Diodes 40, 44, 60, 64 contribute to ensuring that capacitors 46, 66 are charged to a desired rated voltage (e.g., $V_1$ and $V_2$) quickly and that output voltages of secondary sections 14, 16 are maintained at their respective rated output voltages $V_1$, $V_2$. When secondary sections 14, 16 are loaded at or near their respective rated loads, switches 36, 42, 56, 62 are gatingly operated by gating signals applied to gates 37, 43, 57, 63 to keep output voltages $V_1$, $V_2$ substantially at their rated values. Voltage sum $(V_1+V_2)$ is substantially constant as converter 10 operates at rated loads so that if one of output voltage $V_1$, $V_2$ goes up, then the other output voltage $V_1$, $V_2$ must be going down. This opposite-acting response of output voltages $V_1$, $V_2$ must be so in order that voltage sum $(V_1+V_2)$ may remain constant. It is a recognition of these relationships among voltages $V_1$, $V_2$ and voltage sum $(V_1+V_2)$ that governs adjustments to gating signals applied to gates 26, 37, 43, 57, 63.

A problem arises, however, in a multi-output converter apparatus, such as dual-output converter apparatus 10, when start-up is effected in a no-load configuration. In such a no-load start-up operation, voltage sum $(V_1+V_2)$ is not necessarily a constant. As a result, no relationship is available for governing how to adjust pulse width modulating units 72, 76, 80 for adjusting gating signals applied to gates 26, 37, 43, 57, 63 for controlling voltages $V_1$, $V_2$.

Figure 2:
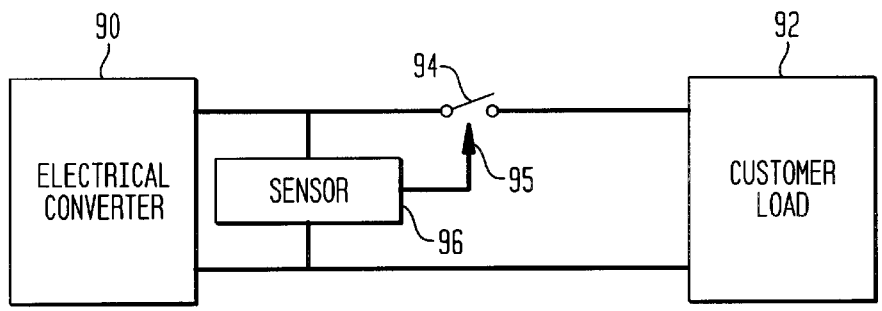
FIG. 2 is a schematic block diagram of a prior art approach to effecting a preload operation of an electrical converter apparatus.

FIG. 2 is a schematic block diagram of a prior art approach to effecting a preload operation of an electrical converter apparatus. Preload regulated operation of a multioutput converter device after start-up is also problematic for reasons similar to problems described in connection with FIG. 1. That is, there is no available relationship upon which to base adjustments to gating signals. Some customers seek to solve the problem by employing an arrangement of the sort illustrated in FIG. 2. In FIG. 2, a converter apparatus 90 is configured for providing power to a customer load 92. A switch 94 and a sensor 96 are coupled between converter apparatus 90 and customer load 92. Sensor 96 is configured and coupled to sense output voltage produced from converter apparatus 90. When a predetermined parameter-set is accomplished by converter apparatus 90, sensor 96 applies a gating signal to a gate 95 to configure switch 94 for coupling converter apparatus 90 with customer load 92. Sensor 96 gatingly controls operation of switch 94 via a gating signal applied to gate 95 to determine whether converter apparatus 90 is coupled with customer load 92. The predetermined parameter-set that occasions application of a gating signal to gate 95 to close switch 94 may, for example, be the achieving of a predetermined output voltage by converter apparatus 90 for a predetermined time. In such manner, one can ensure that a regulated voltage is available from converter apparatus 90 before coupling converter apparatus 90 with customer load 92. Such an arrangement is burdensome to a customer and preferably should be accommodated in the design of converter apparatus 90 without requiring the customer to "rig" a solution.

Figure 3:
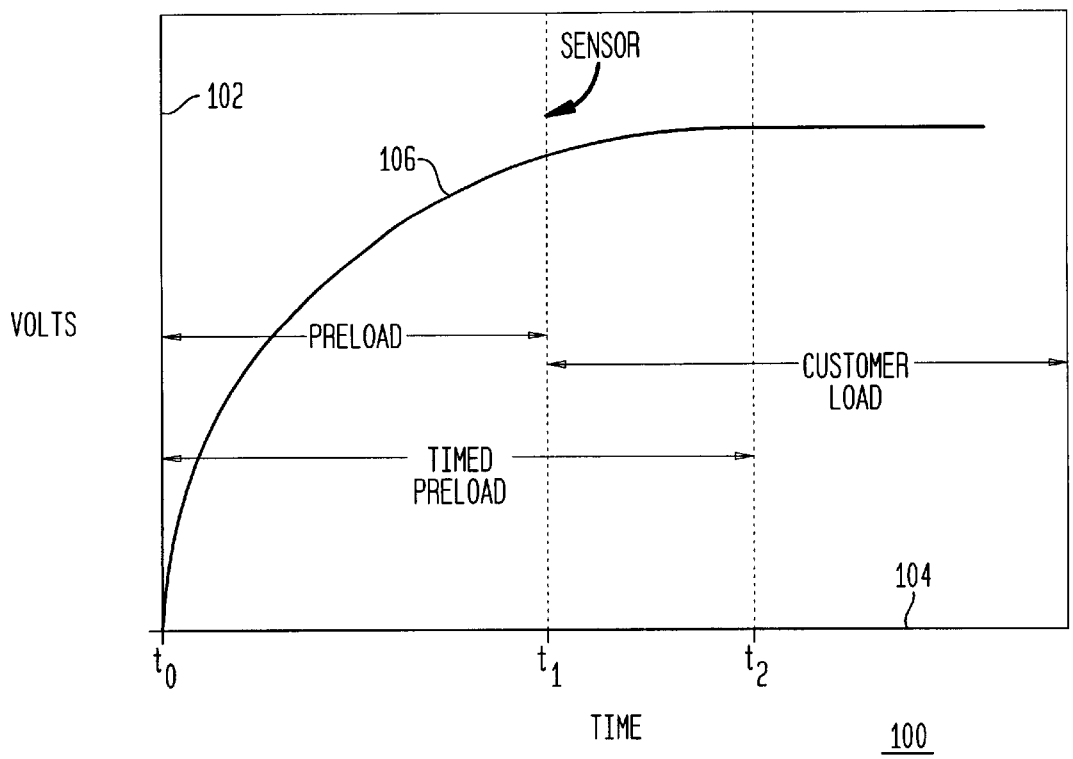
FIG. 3 is a graphic representation of output voltage of an electrical converter apparatus as a function of time.

FIG. 3 is a graphic representation of output voltage of an electrical converter apparatus as a function of time. In FIG. 3, a graphic plot 100 indicates voltage on an axis 102 as a function of time on an axis 104. FIG. 3 illustrates the output voltage from a converter device (e.g., converter apparatus 90; FIG. 2) provided to a customer load (e.g., customer load 92; FIG. 2) indicating how use of a sensor (e.g., sensor 96; FIG. 2) may be employed.

Voltage is indicated by a curve 106 in FIG. 3 as varying from a substantially zero value at a time $t_0$ an operating voltage level during times following a time $t_2$. A time interval from time $t_0$ until a time $t_1$ is a preload period during which voltage 106 is too unregulated or is of insufficient magnitude to be useful for the intended load. At time $t_1$, a sensor (e.g., sensor 96; FIG. 2) determines that certain preconditions are met, such as voltage 106 having been greater than a predetermined value for at least a certain period of time, and gates a switch to close (e.g., switch 94; FIG. 2) to couple the intended load with the converter apparatus. It is for this reason that the interval $t_0$–$t_1$ is indicated as a preload period in FIG. 3.

FIG. 3 also indicates employment of an alternate approach to solving the problem of ensuring regulated voltage is available for a load using a timed preload approach: a time delay may be imposed from start-up before coupling the intended load with the converter apparatus. Using such an alternate approach, the timer may be set to couple the load with the converter apparatus at a time $t_2$. It is for this reason that the interval $t_0$–$t_2$ is indicated as a timed preload period in FIG. 3. Preferably, a timed preload period is somewhat longer than a preload period in order to ensure a safety margin against coupling a load with a converter device before specified preconditions are satisfied.

Either of the two approaches indicated in FIG. 3—a sensor-activated switching approach and a timed coupling approach—ensures that the intended load is not operated with an insufficient supply voltage, and ensures that no extra load is imposed on the converter after start-up is completed and the load is coupled with the converter apparatus.

Figure 4:
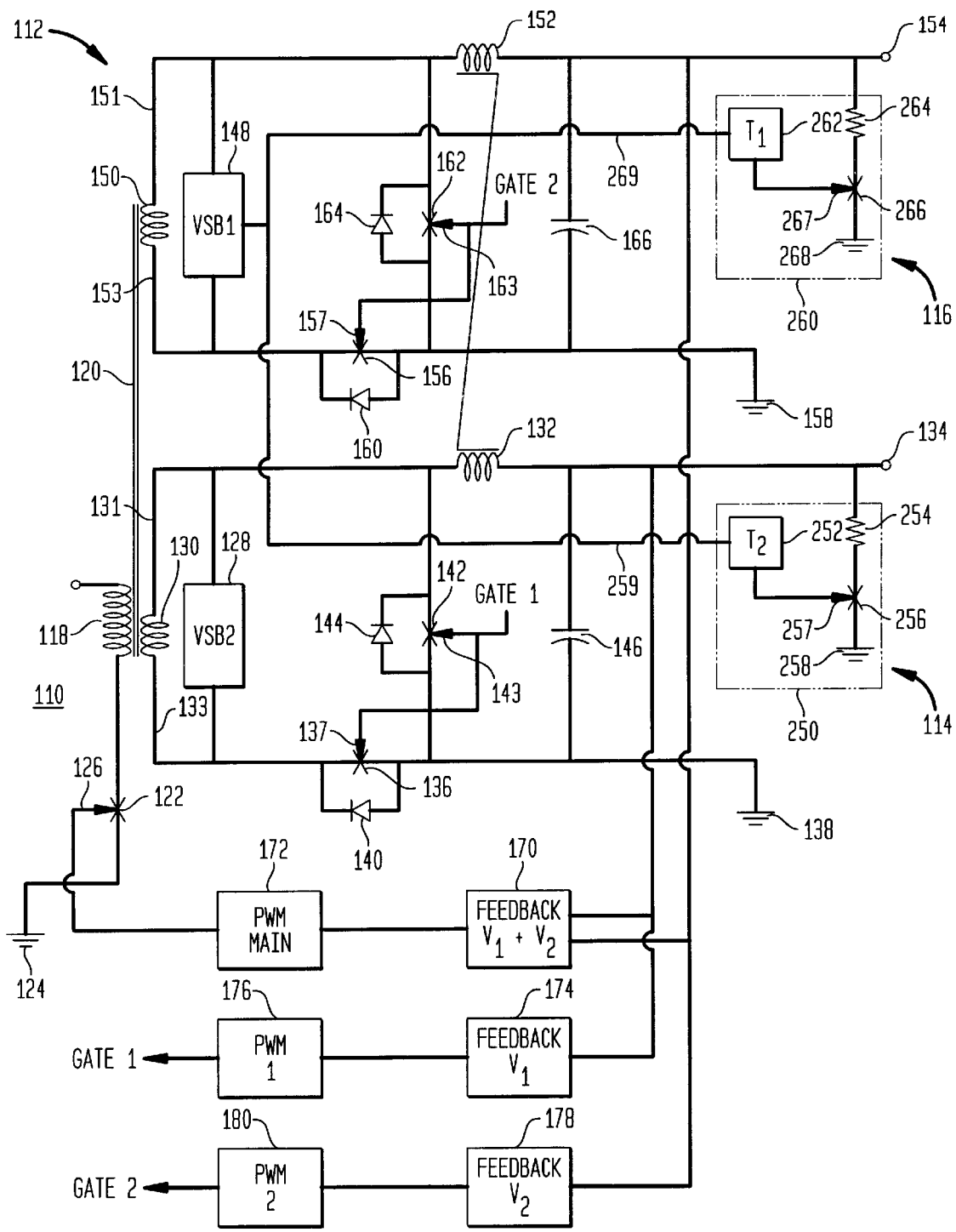
FIG. 4 is an electrical schematic diagram of a dual-output electrical converter apparatus constructed according to the present invention.

FIG. 4 is an electrical schematic diagram of a dual-output electrical converter apparatus constructed according to the present invention. In FIG. 4, a converter apparatus 110 is configured for dual output and includes a primary section 112 and secondary sections 114, 116. Primary section 112 includes the primary winding 118 of a transformer 120 and a switch 122 for selectively coupling primary winding 118 to ground 124. Switch 122 is gatingly controlled by a gating signal applied at a gate 126.

Secondary section 114 includes a secondary winding 130 of transformer 120. Secondary winding 130 has two connection loci 131, 133. Connection locus 131 is coupled with an inductor 132. Inductor 132 is coupled with a first output locus 134. Connection locus 133 is coupled with a switch 136, and switch 136 is coupled with a ground locus 138. A diode element 140 is connected in parallel with switch 136. Typically, diode element 140 is integrally included with switch 136 when switch 136 is embodied in a MOSFET structure. A switch 142 is connected in parallel with secondary winding 130 between inductor 132 and secondary winding 130, and a diode element 144 is connected in parallel with switch 142. Typically, diode element 144 is integrally included with switch 142 when switch 142 is embodied in a MOSFET structure. A capacitor 146 is coupled in parallel with secondary winding 130 between inductor 132 and output locus 134. Switch 136 is gatingly controlled by a gating signal applied at a gate 137. Switch 142 is gatingly controlled by a gating signal applied at a gate 143. Secondary section 114 also includes a secondary bias power circuit 128 coupled in parallel across secondary winding 130. Secondary bias power circuit 128 is provided to power selected elements in secondary section 114, such as pulse width modulation circuitry (to be described later) and other circuit elements. Details of connections for providing power by secondary bias power circuit 128 are not illustrated in detail in FIG. 4 in order to avoid cluttering FIG. 4.

Secondary section 116 includes a secondary winding 150 of transformer 120. Secondary winding 150 has two connection loci 151, 153. Connection locus 151 is coupled with an inductor 152. Inductor 152 is connected with a first output locus 154. Preferably, inductors 232, 152 are coupled. Connection locus 153 is coupled with a switch 156, and switch 156 is coupled with a ground locus 158. A diode element 160 is connected in parallel with switch 156. Typically, diode element 160 is integrally included with switch 156 when switch 156 is embodied in a MOSFET structure. A switch 162 is connected in parallel with secondary winding 150 between inductor 152 and secondary winding 150, and a diode element 164 is connected in parallel with switch 162. Typically, diode element 164 is integrally included with switch 162 when switch 162 is embodied in a MOSFET structure. A capacitor 166 is coupled in parallel with secondary winding 150 between inductor 152 and output locus 154. Switch 156 is gatingly controlled by a gating signal applied at a gate 157. Switch 162 is gatingly controlled by a gating signal applied at a gate 163. Secondary section 116 also includes a secondary bias power circuit 148 coupled in parallel across secondary winding 150. Secondary bias power circuit 148 is provided to power selected elements in secondary section 116, such as pulse width modulation circuitry (to be described later) and other circuit elements. Details of connections for providing power by secondary bias power circuit 148 are not illustrated in detail in FIG. 4 in order to avoid cluttering FIG. 4.

A primary feedback circuit 170 is coupled with output loci 134, 154 to monitor the value of the voltage suM ($V_1+V_2$)

of output voltages $V_1$, $V_2$ from secondary sections 114, 116. Primary feedback circuit 170 provides an output signal indicating voltage sum $(V_1+V_2)$ from secondary sections 114, 116 to a primary pulse width modulation unit 172. Primary pulse width modulation unit 172 provides a gating signal to gate 126 of switch 122. Switch 122 is thus employed to control operational inclusion of primary winding 118 in converter apparatus 110 in response to a gating signal from primary pulse width modulation unit 172 based upon the value of voltage sum $(V_1+V_2)$ from secondary sections 114, 116.

A secondary feedback circuit 174 is coupled with output locus 134 to monitor the value of output voltage $V_1$ from secondary section 114. Secondary feedback circuit 174 provides an output signal indicating output voltage $V_1$ from secondary section 114 to a secondary pulse width modulation unit 176. Secondary pulse width modulation unit 176 provides a gating signal to gates 137, 143 of switches 136, 142. Switches 136, 142 are thus employed to control operational inclusion of secondary section 114 in converter apparatus 110 in response to a gating signal from secondary pulse width modulation unit 176 based upon the value of output voltage $V_1$ from secondary section 114. Operation of switches 136, 142 is related to operation of switch 122 (in primary section 112). Switch 136 operates in-phase with switch 122; switch 142 operates out-of-phase with switch 122. Secondary pulse width modulation unit 176 affects operation of switches 136, 142 using gating signal GATE 1 when output from secondary feedback circuit 174 indicates a need to adjust output voltage $V_1$. For example if $V_1$ is increasing, when $V_1$ reaches a predetermined value secondary pulse width modulating unit 176 will operate to reduce driving voltages for switches 136, 142. Such a reduction in drive voltage causes an increased voltage drop across switches 136, 142 so that $V_1$ decreases. Because $(V_1+V_2)$ remains constant, a reduction in $V_1$ causes an increase in $V_2$, and an increase in $V_1$ causes a decrease in $V_2$. It is by such an arrangement that local control of one secondary feedback circuit 174, 178 can impose some regulation for both secondary sections 114, 116.

Secondary section 114 also includes a timed load unit 250. Timed load unit 250 includes a timer unit 252, a preload 254 and a gated switch 256. Preload 254 is coupled with output locus 134 and is coupled with a ground locus 258 via gated switch 256. Timer unit 252 applies a gating signal to a gate 257 of switch 256 to change the state of switch 256 when a predetermined time elapses (e.g., time interval $t_0$–$t_2$; FIG. 3). Timed load unit 250 is coupled with secondary bias power circuit 148 via a line 259. Alternatively, each secondary section 114, 116 may be powered by its own respective secondary bias power circuit 128, 148. Other combinations for powering from respective secondary bias power circuits may be carried out in other multi-output converter configurations.

A secondary feedback circuit 178 is coupled with output locus 154 to monitor the value of output voltage $V_2$ from secondary section 116. Secondary feedback circuit 178 provides an output signal indicating output voltage $V_2$ from secondary section 116 to a secondary pulse width modulation unit 180. Secondary pulse width modulation unit 180 provides a gating signal to gates 157, 163 of switches 156, 162. Switches 156, 162 are thus employed to control operational inclusion of secondary section 116 in converter apparatus 110 in response to a gating signal from secondary pulse width modulation unit 180 based upon the value of output voltage $V_2$ from secondary section 116. Operation of switches 156, 162 is related to operation of switch 122 (in primary section 112). Switch 156 operates in-phase with switch 122; switch 162 operates out-of-phase with switch 122. Secondary pulse width modulation unit 180 affects operation of switches 156, 162 using gating signal GATE 2 when output from secondary feedback circuit 178 indicates a need to adjust output voltage $V_2$. For example if $V_2$ is increasing, when $V_2$ reaches a predetermined value secondary pulse width modulating unit 180 will operate to reduce driving voltages for switches 156, 162. Such a reduction in drive voltage causes an increased voltage drop across switches 156, 162 so that $V_2$ decreases. Because $(V_1+V_2)$ remains constant, a reduction in $V_2$ causes an increase in $V_1$, and an increase in $V_2$ causes a decrease in $V_1$. It is by such an arrangement that local control of one secondary feedback circuit 174, 178 can impose some regulation for both secondary sections 114, 116.

Secondary section 116 also includes a timed load unit 260. Timed load unit 260 includes a timer unit 262, a preload 264 and a gated switch 266. Preload 264 is coupled with output locus 154 and is coupled with a ground locus 268 via gated switch 266. Timer unit 262 applies a gating signal to a gate 267 of switch 266 to change state of switch 266 when a predetermined time elapses (e.g., time interval $t_0$–$t_2$; FIG. 3). Timed load unit 260 is coupled with secondary bias power circuit 148 via a line 269. Alternatively, each secondary section 114, 116 may be powered by its own respective secondary bias power circuit 128, 148. Other combinations for powering from respective secondary bias power circuits may be carried out in other multi-output converter configurations.

Diodes 140, 144, 160, 164 serve to ensure that current flows in only one direction during critical times of operation of converter apparatus 110, such as during start-up operations. Diodes 140, 144, 160, 164 contribute to ensuring that capacitors 146, 166 are charged to a desired rated voltage (e.g., $V_1$ and $V_2$) quickly and that output voltages of secondary sections 114, 116 are maintained at their respective rated output voltages $V_1$, $V_2$. When secondary sections 114, 116 are loaded at or near their respective rated loads, switches 136, 142, 156, 162 are gatingly operated by gating signals applied to gates 137, 143, 157, 163 to keep output voltages $V_1$, $V_2$ substantially at their rated values. Voltage sum $(V_1+V_2)$ is substantially constant as converter 110 operates at rated loads. In such an operational arrangement, if one voltage of $V_1$, $V_2$ goes up, then the other voltage of $V_1$, $V_2$ must be going down in order that voltage sum $(V_1+V_2)$ may remain constant. It is a recognition of these relationships among voltages $V_1$, $V_2$ and voltage sum $(V_1+V_2)$ that governs adjustments to gating signals applied to gates 126, 137, 143, 157, 163.

A problem may arise, however, in a multi-output converter apparatus, such as dual-output converter apparatus 110, when start-up is effected in a no-load configuration. In such a no-load start-up operation, voltage sum $(V_1+V_2)$ is not necessarily a constant. As a result, no relationship is available for governing how to adjust pulse width modulating units 172, 176, 180 for adjusting gating signals applied to gates 126, 137, 143, 157, 163 for controlling voltages $V_1$, $V_2$. It is just such a problem that is avoided by the present invention, embodied in exemplary timed load units 250, 260.

At start-up (e.g., at time $t_0$, FIG. 3) switches 256, 266 are closed and preloads 254, 264 are coupled with ground loci 258, 268 so that preloads 254, 264 are coupled with converter apparatus 110 during start-up. By providing preloads 254, 264 for converter apparatus 110 pulse width modulator units 172, 176, 180 have appropriate references to operate predictably to move toward a regulated voltage for converter apparatus 110. That is, providing preloads 254, 264 configures converter apparatus 110 so that output voltages $V_1$, $V_2$ will sum to a constant voltage sum $(V_1+V_2)$, and pulse width modulation units 172, 176, 180 can respond appropriately to changes in voltage sum $(V_1+V_2)$ during preload operations.

When timer units 252, 262 "time out" a predetermined time interval (e.g., time interval $t_0$–$t_2$; FIG. 3) a gating signal is applied to gates 257, 267 of gated switches 256, 266 by timer units 252, 262 to open switches 256, 266. Opening switches 256, 266 disconnects preloads 254, 264 from ground loci 258, 268, thereby removing preloads 254, 264 from operational inclusion in converter apparatus 110. In such an arrangement preloads 254, 264 are provided for configuring converter apparatus 110 for reliable predictable operation during a no-load start-up, but preloads 254, 264 are not included in the output of converter apparatus 110 during subsequent loaded operations. Timed load units 250, 260 are compact, have a low part count and are powered on-board with no special power hook-up provisions required other than simple connection lines.

Figure 5:
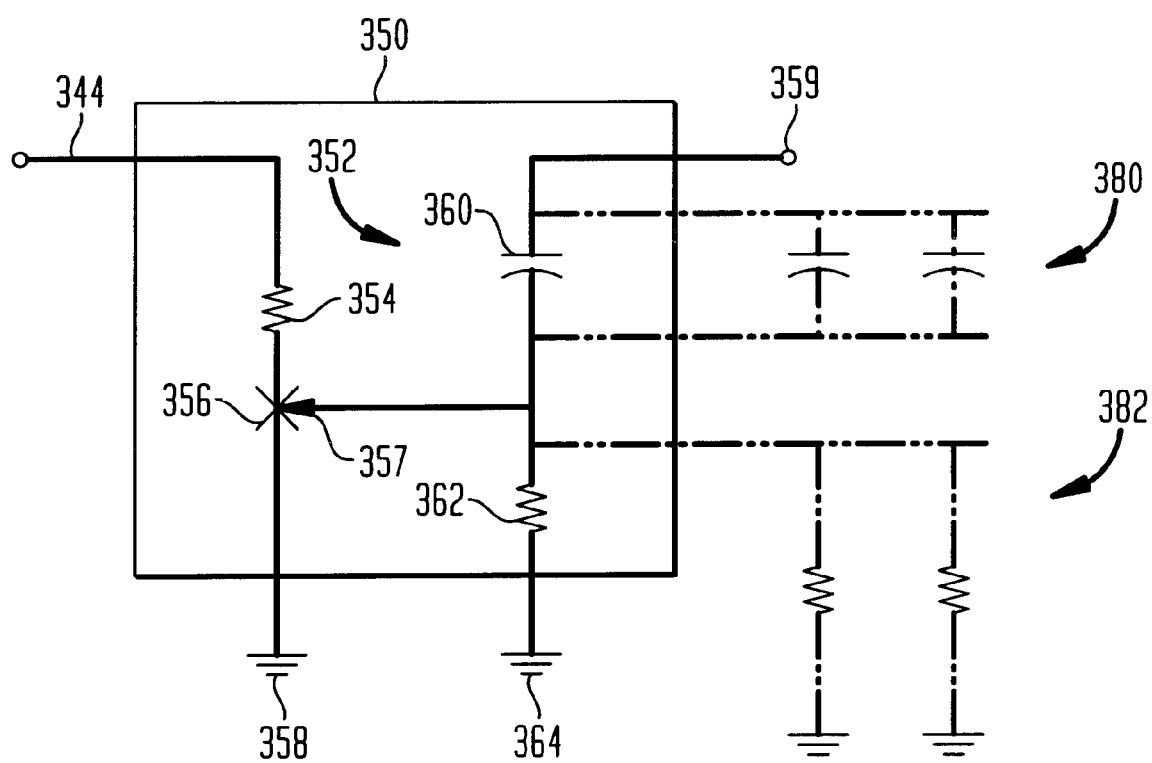
FIG. 5 is an electrical schematic diagram of the preferred embodiment of a timed load apparatus constructed according to the present invention.

FIG. 5 is an electrical schematic diagram of the preferred embodiment of a timed load apparatus constructed according to the present invention. In FIG. 5, a timed load unit 350 includes a timer unit 352, a preload 354 and a gated switch 356 for switchingly controlling coupling of preload 354 with a ground locus 358. Preload 354 is connected with pin 344; pin 344 is coupled with an output locus of an associated converter, such as output loci 134, 154 (FIG. 4). Timed load unit 350 is representative of timed load units 250, 260 in FIG. 4. Preload 354 is representative of preloads 254, 264 in FIG. 4. Gated switch 356 is representative of gated switches 256, 266 in FIG. 4. Ground locus 358 is representative of ground loci 258, 268 in FIG. 4.

Timer unit 352 includes a capacitor 360 coupled in series with a resistor 362 between bias line 359 (representative of lines 259, 269; FIG. 4) and a ground locus 364. A gating signal is provided to a gate 357 of gated switch 356 from a connection locus between capacitor 360 and resistor 362. Thus, timer unit 352 is embodied in an RC circuit having a time constant that is determined by the values of capacitance of capacitor 360 and resistance of resistor 362 for determining when a gating signal is provided to gate 357. As an alternative design for enabling customers to custom configure their converter devices, there may be provided external connection loci for a customer to couple additional capacitors 380 and additional resistors 382, if desired. Timed load unit 350 is constructed of few parts that are all small in size. Timed load unit 350 is powered by a power source already existing in converter apparatuses. No special redesign is necessary to include timed load units such as timed load unit 350 in converter devices, and the incremental increase in space required for converter apparatuses to accommodate adding such timed load units is essentially negligible.

At start-up (e.g., at time $t_0$, FIG. 3) gated switch 356 is closed and preload 354 is coupled with ground locus 358 so that preload 354 is coupled with a converter apparatus (e.g., converter apparatus 110; FIG. 4) during start-up. By providing preload 354 for the connected converter apparatus, pulse width modulator units associated with the converter apparatus (e.g., pulse width modulator units 172, 176, 180; FIG. 4) have appropriate references to operate predictably to move toward a regulated voltage output for the converter apparatus, substantially as described in connection with FIG. 4.

When timer unit 352 "times out" a predetermined time interval (e.g., time interval $t_0$–$t_2$; FIG. 3) a gating signal is applied to gate 357 of gated switch 356 by timer unit 352 to open switch 356. Opening switch 356 disconnects preload 354 from ground locus 358, thereby removing preload 354 from operational inclusion in the converter apparatus. In such an arrangement preload 354 is provided for configuring the converter apparatus for reliable predictable operation during a no-load start-up, but preload 354 is not included in the output of the converter apparatus during subsequent loaded operations. Timed load unit 350 is compact, has a low part count and is powered on-board with no special power hook-up provisions required other than simple connection lines.

Figure 6:
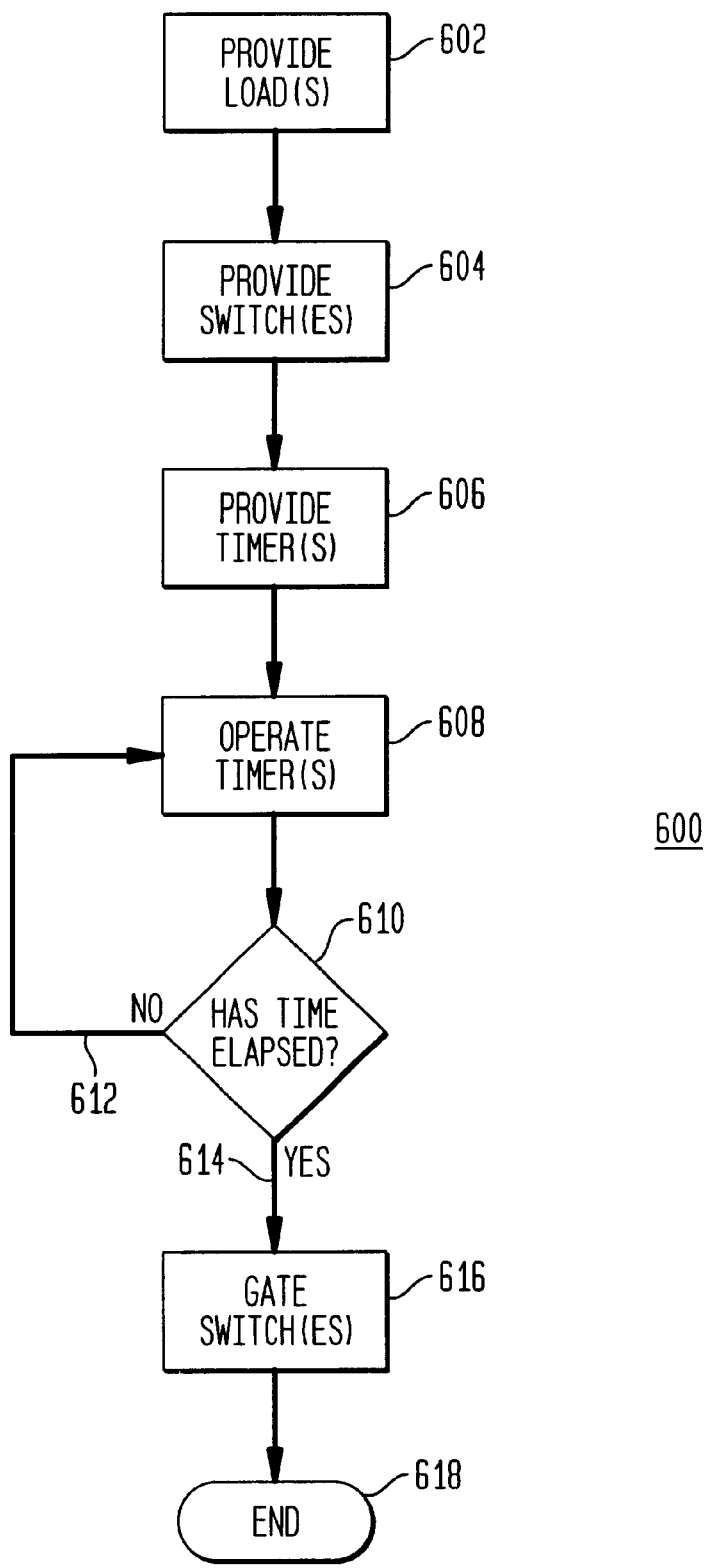
FIG. 6 is a flow diagram illustrating the preferred embodiment of the method of the present invention.

FIG. 6 is a flow diagram illustrating the preferred embodiment of the method of the present invention. In FIG. 6, a method 600 is illustrated for effecting a controlled preload operation of an electrical converter device that includes a primary circuit section inductively coupled with a plurality of secondary circuit sections, each respective secondary circuit section presenting an output voltage at a respective output locus. Method 600 begins with providing a respective load coupled with each respective output locus, as indicated by a block 602. The respective loads have been representatively described in FIGS. 4 and 5 as preloads 254, 264, 354.

Method 600 continues with providing a respective switch device electrically coupling each respective load within its respective secondary circuit section, as indicated by a block 604.

Method 600 continues with providing a respective timer device coupled with each respective switch device, as indicated by a block 606.

Method 600 continues with operating each respective timer device to begin "time out" a predetermined time interval, as indicated by a block 608.

Method 600 continues by posing a query, as indicate by a query block 610, to inquire whether the predetermined time interval established by the timers has elapsed. If the predetermined time interval has not elapsed, method 600 continues via NO response line 612 to continue to operate the timers, as indicated by block 608. If the predetermined time interval has elapsed, method 600 continues via YES response line 614 to gate respective switches to orient respective switches to electrically disconnect respective loads from their respective secondary circuit sections, as indicated by a block 616.

After completing the step indicated by block 616, method 600 ends, as indicated by a termination locus 618, until the next start-up sequence of the converter device.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

I claim:

1. An apparatus for effecting a preload operation of an electrical converter device; said electrical converter device including a primary circuit section and at least one secondary circuit section; said primary circuit section being inductively coupled with said at least one secondary circuit section; said at least one secondary circuit section presenting at least one output voltage at at least one output locus; the apparatus comprising:

(a) a load coupled with at least one selected output locus of said at least one output locus;

(b) a switch device; said switch device electrically coupling said load within said at least one secondary circuit section; and (c) a timer device coupled with said switch device; said timer device orienting said switch device to electrically disconnect said load from said at least one secondary circuit section after an elapsing of a predetermined time interval.

2. An apparatus for effecting a preload operation of an electrical converter device as recited in claim 1 wherein said at least one secondary circuit section includes a bias power circuit for powering selected portions of said at least one secondary circuit section; and wherein the apparatus is coupled with said bias power circuit for receiving operating power.

3. An apparatus for effecting a preload operation of an electrical converter device as recited in claim 1 wherein said timer device is an RC timer circuit.

4. An apparatus for effecting a preload operation of an electrical converter device as recited in claim 2 wherein said timer device is an RC timer circuit.

5. An apparatus for effecting a preload operation of an electrical converter device as recited in claim 3 wherein said timer device includes customer-accessible connection loci for accommodating coupling of additional components with said timer device; said additional components affecting said time interval.

6. An apparatus for effecting a preload operation of an electrical converter device as recited in claim 4 wherein said timer device includes customer-accessible connection loci for accommodating coupling of additional components with said timer device; said additional components affecting said time interval.

7. An apparatus for effecting a controlled preload operation of an electrical converter device; said electrical converter device including a primary circuit section and a plurality of secondary circuit sections; said primary circuit section being inductively coupled with said plurality of secondary circuit sections; each respective secondary circuit section of said plurality of secondary circuit sections presenting an output voltage at a respective output locus; the apparatus comprising:

(a) a respective load coupled with each said respective output locus;

(b) a respective switch device electrically coupling each said respective load within said respective secondary circuit section; and (c) a respective timer device coupled with each said respective switch device; each said respective timer device orienting said respective switch device to electrically disconnect said respective load from said respective secondary circuit section after an elapsing of a predetermined time interval.

8. An apparatus for effecting a controlled preload operation of an electrical converter device as recited in claim 7 wherein each said respective secondary circuit section includes a bias power circuit for powering selected portions of said respective secondary circuit section; and wherein the apparatus is coupled with at least one said bias power circuit for receiving operating power.

9. An apparatus for effecting a controlled preload operation of an electrical converter device as recited in claim 7 wherein said timer device is an RC timer circuit.

10. An apparatus for effecting a controlled preload operation of an electrical converter device as recited in claim 8 wherein said timer device is an RC timer circuit.

11. An apparatus for effecting a controlled preload operation of an electrical converter device as recited in claim 9 wherein said timer device includes customer-accessible connection loci for accommodating coupling of additional components with said timer device; said additional components affecting said time interval.

12. An apparatus for effecting a controlled preload operation of an electrical converter device as recited in claim 10 wherein said timer device includes customer-accessible connection loci for accommodating coupling of additional components with said timer device; said additional components affecting said time interval.

13. A method for effecting a controlled preload operation of an electrical converter device; said electrical converter device including a primary circuit section and a plurality of secondary circuit sections; said primary circuit section being inductively coupled with said plurality of secondary circuit sections; each respective secondary circuit section of said plurality of secondary circuit sections presenting an output voltage at a respective output locus; the method comprising the steps of:

(a) providing a respective load coupled with each said respective output locus;

(b) providing a respective switch device electrically coupling each said respective load within said respective secondary circuit section;

(c) providing a respective timer device coupled with each said respective switch device; and (d) operating each said respective timer device to orient said respective switch device to electrically disconnect said respective load from said respective secondary circuit section after an elapsing of a predetermined time interval.

14. A method for effecting a controlled preload operation of an electrical converter device as recited in claim 13 wherein each said respective secondary circuit section includes a bias power circuit for powering selected portions of said respective secondary circuit section; and wherein each said respective timer device is coupled with at least one said bias power circuit for receiving operating power.

15. A method for effecting a controlled preload operation of an electrical converter device as recited in claim 13 wherein said timer device is an RC timer circuit.

16. A method for effecting a controlled preload operation of an electrical converter device as recited in claim 14 wherein said timer device is an RC timer circuit.

17. A method for effecting a controlled preload operation of an electrical converter device as recited in claim 15 wherein said timer device includes customer-accessible connection loci for accommodating coupling of additional components with said timer device; said additional components affecting said time interval.

18. A method for effecting a controlled preload operation of an electrical converter device as recited in claim 16 wherein said timer device includes customer-accessible connection loci for accommodating coupling of additional components with said timer device; said additional components affecting said time interval.

19. An apparatus for effecting a preload operation of an electrical converter device; said electrical converter device including at least one secondary circuit section; each said at least one secondary circuit section including an output locus; the apparatus coupled to the output locus of at least one of the at least one secondary circuit sections and comprising:

(a) a load;

(b) a switch device electrically coupling said load within said at least one secondary circuit section; and (c) a timer device coupled with said switch device; said timer device orienting said switch device to electrically disconnect said load from said at least one secondary circuit section after a predetermined time interval.

20. An apparatus for effecting a preload operation of an electrical converter device as recited in claim 19 wherein said at least one secondary circuit section includes a bias power circuit for powering selected portions of said at least one secondary circuit section and the timer device is coupled with said bias power circuit for receiving operating power.

21. An electrical converter device comprising:
- (a) a primary circuit section;
- (b) at least one secondary circuit section, said primary circuit section being inductively coupled with said at least one secondary circuit section, said at least one secondary circuit section presenting at least one output voltage at at least one output locus; and
- (c) a preload element including:
  - (1) a load coupled with at least one selected output locus of said at least one output locus;
  - (2) a switch device electrically coupling said load within said at least one secondary circuit section; and
  - (3) a timer device coupled with said switch device, said timer device orienting said switch device to electrically disconnect said load from said at least one secondary circuit section after an elapsing of a predetermined time interval.

* * * * *